United States Patent
Lambert et al.

(10) Patent No.: US 8,428,079 B1
(45) Date of Patent: Apr. 23, 2013

(54) SYSTEMS AND METHODS FOR DISCOVERING A WIRELESS NETWORK IN A PEER-TO-PEER NETWORK

(75) Inventors: Paul A. Lambert, Mountain View, CA (US); Lu Chang, Cupertino, CA (US)

(73) Assignee: Marvell International, Ltd, Hamilton (BM)

( * ) Notice: Subject to any disclaimer, the term of this patent is extended or adjusted under 35 U.S.C. 154(b) by 354 days.

(21) Appl. No.: 12/563,390

(22) Filed: Sep. 21, 2009

Related U.S. Application Data (60) Provisional application No. 61/099,751, filed on Sep. 24, 2008.

(51) Int. Cl.
*H04L 12/28* (2006.01)
*H04L 12/43* (2006.01)
*H04B 3/10* (2006.01)
*G06F 15/177* (2006.01)
*G06F 15/16* (2006.01)

(52) U.S. Cl.
USPC ........... 370/461; 370/254; 370/491; 370/500; 709/222; 709/228

(58) Field of Classification Search .......... 370/254–255, 370/343–350, 447–449, 491, 500, 503–504, 370/461; 709/220–222, 227–229
See application file for complete search history.

(56) References Cited

U.S. PATENT DOCUMENTS

| | | | |
|---|---|---|---|
| 2003/0016732 A1* | 1/2003 | Miklos et al. | 375/132 |
| 2003/0063619 A1* | 4/2003 | Montano et al. | 370/443 |
| 2007/0111680 A1* | 5/2007 | Tiedemann et al. | 455/114.2 |
| 2007/0286136 A1* | 12/2007 | Rittle et al. | 370/338 |
| 2009/0017797 A1* | 1/2009 | Li et al. | 455/414.1 |
| 2009/0059828 A1* | 3/2009 | Kubo | 370/311 |

* cited by examiner

*Primary Examiner* — Andrew Lai
*Assistant Examiner* — Jeremy Costin (57) ABSTRACT

An integrated circuit configured to operate in a mobile device includes a discovery generator module. The discovery generator module is configured to generate a corresponding random value for each beacon interval. A discovery control module is configured to determine a duration of time of a given beacon interval in which the mobile device is to operate in at least one of an active mode and a sleep mode. The duration of time is based on the corresponding random value generated for the given beacon interval. A physical layer (PHY) device is configured to wirelessly transmit a discovery request signal during the time the mobile device is operating in the active mode. The mobile device is partially powered down or fully powered down during the time the mobile device is operating in the sleep mode.

26 Claims, 6 Drawing Sheets

SYSTEMS AND METHODS FOR DISCOVERING A WIRELESS NETWORK IN A PEER-TO-PEER NETWORK

CROSS-REFERENCE TO RELATED APPLICATIONS

This application claims the benefit of U.S. Provisional Application No. 61/099,751, filed on Sep. 24, 2008. The disclosure of the above application is incorporated herein by reference in its entirety.

FIELD

The present disclosure relates to discovery between peer-to-peer devices.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Infrastructure mode networks typically include a discovery server and/or a coordination server for discovery and connection setup between mobile devices. The discovery and coordination servers obtain information regarding network connected peers and application-specific information. The discovery and coordination servers are typically located at an access point. A peer-to-peer (P2P) network generally does not include a discovery server, a coordination server, or an access point. Mobile devices (or peer devices) of a P2P network communicate directly with each other.

Discovery of peer devices within a P2P network may include active discovery scanning or passive discovery scanning. Active discovery scanning refers to a first mobile device transmitting probe messages to peer devices (i.e., other mobile devices). The first mobile device may transmit probe messages to join a P2P network and/or to communicate with another mobile device. A probe message includes, for example, a basic service set identifier (BSSID) and data rates of the first mobile device. Peer devices operating in a "listen" mode (at the time a probe message is sent by the first mobile device) may respond to the probe message by sending a probe response signal.

Passive discovery scanning refers to a first mobile device that temporarily operates as an access point and transmits beacons at periodic intervals. The first mobile device generates the beacons to allow other mobile devices to join a P2P network and/or to communicate with the first mobile device. A beacon includes, for example, a BSSID, time synchronization information, power saving information, and capability information associated with the first mobile device. During each of the periodic intervals, the first mobile device operates in a "listen" mode. While operating in the listen mode the first mobile device is typically powered ON and "listens" or waits for response signals from peer devices. Examples of active and passive scanning are described in IEEE 802.11 standards.

Mobile devices typically operate in a "sleep" mode to conserve power. While operating in a sleep mode a mobile device may be partially powered down or fully powered down. Mobile devices that perform active and/or passive scanning transition between operating in a listen mode and a sleep mode. As an example discovery process, a mobile device may operate in a listen mode at least 50% of the time that the mobile device is operating in a discovery enabled mode (i.e., at least 50% duty cycle). The mobile device may operate in a sleep mode the remainder (or other 50%) of the time that the mobile device is in the discovery enabled mode.

SUMMARY

In one embodiment, an integrated circuit is configured to operate in a mobile device and includes a discovery generator module. The discovery generator module is configured to generate a corresponding random value for each beacon interval. A discovery control module is configured to determine a duration of time of a given beacon interval in which the mobile device is to operate in at least one of an active mode and a sleep mode. The duration of time is based on the corresponding random value generated for the given beacon interval. A physical layer (PHY) device is configured to wirelessly transmit a discovery request signal during the time the mobile device is operating in the active mode. The mobile device is partially powered down or fully powered down during the time the mobile device is operating in the sleep mode.

In still other features, the systems and methods described above are implemented by a computer program executed by one or more processors. The computer program can reside on a computer readable medium such as but not limited to memory, nonvolatile data storage, and/or other suitable tangible storage mediums.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

In the following description, a mobile device and/or a mesh point may refer to a mobile device, a service request device (SRD), user equipment (UE), a network device, and/or a mobile node. A mobile device can include equipment of an end user, such as a processor, a radio interface adaptor, etc. A mobile device can include a mobile network device, a personal data assistant (PDA), a computer, etc.

A mobile device may refer to and/or include a control module, a transceiver, a protocol stack of a transceiver and/or communication layers, such as a physical (PHY) layer, a media access control (MAC) layer, a radio link control (RLC) layer, a packet data convergence protocol (PDCP) layer, a RRC layer, etc. Although a particular number of each mobile device is shown, any number of each mobile device may be included in a network. Each of the mobile devices may be considered as a remote network device relative to another mobile device or peer device.

Also, in the following description a beacon and a beacon signal may be associated with synchronous communication and include a service set identifier (SSID) or a basic SSID (BSSID), Internet protocol (IP) address, time synchronization bits, characteristic bits, capability bits, etc. of a host device (device transmitting beacon signal). The characteristic bits may indicate characteristics of a device, such as data rates, frequencies or channels of operation, etc. The capability bits may indicate capabilities of a device, such as Internet access capability, printing capability, half duplex and/or full duplex mode capability, and communication protocol and application capabilities. A beacon and a beacon signal may be transmitted by a first mobile device to announce to other mobile devices presence of the first mobile device and to relay information to the other mobile devices. Beacon and beacon signals may be generated periodically, or at irregular or sporadic intervals. The timing of the beacons and the beacon signals may be based on the duration of corresponding listen and sleep periods.

In addition, in the following description a probe request and a probe request signal may be associated with asynchronous communication and include a SSID or BSSID, IP address, characteristic bits, capability bits, information request bits, etc. of a host device. The information request bits may identify information requested by the mobile device that transmits the probe request signal. The information request bits may, for example, be used to request characteristics and capabilities of peer devices.

Furthermore, in the following description, a beacon response signal and probe response signal may include a BSSID, time synchronization bits, characteristic bits, capability bits, information request bits, data (i.e., user) bits, etc of a peer device that responds to a beacon or probe request signal. The beacon response signal and the probe response signal may be generated by a mobile device that respectively receives a beacon signal or a probe request signal. The beacons, beacon signals, probe request signals, beacon response signals, and probe response signals may satisfy IEEE 802.11 standards.

Figure 1:
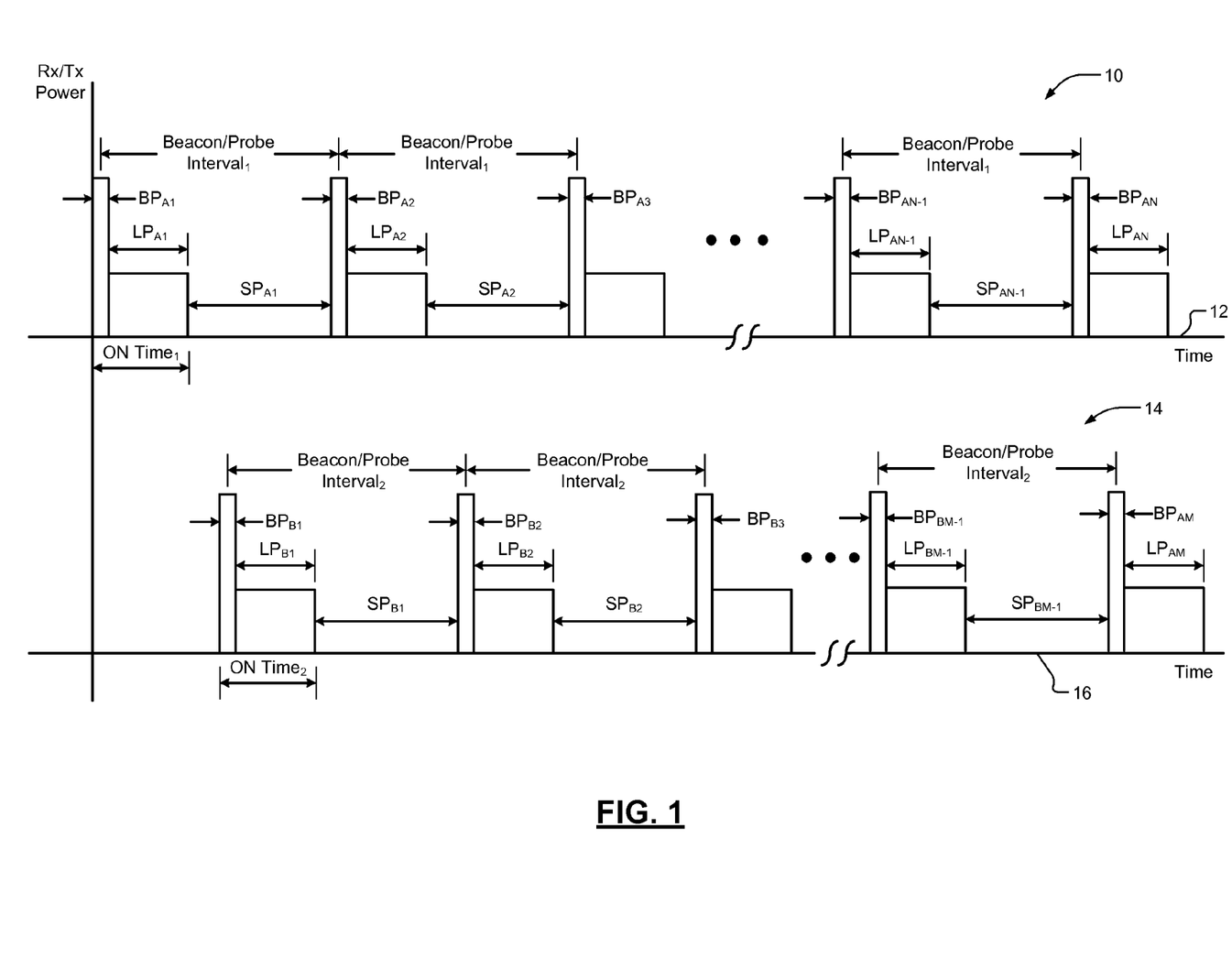
FIG. 1 is a timing diagram illustrating active modes and sleep modes for peer devices with fixed durations.

FIG. 1 illustrates an example timing diagram of communication between two mobile devices (peer devices) operating in a peer-to-peer (P2P) network. The timing diagram illustrates times during which each of the two mobile devices respectively operate in an active mode (e.g., discovery powered ON mode) and a sleep mode. An active mode refers to a beacon mode (e.g., a probe request mode) or a listen mode. A mobile device generates and transmits beacon signals while operating in a beacon mode. A mobile device generates and transmits probe request signals while operating in a probe request mode.

The discovery process includes a first mobile device transitioning between active and sleep modes of operation during each beacon/probe interval. For example, during an active mode of operation, the first mobile device transmits a beacon signal or a probe request signal to one or more peer devices and listens for a probe response signal from a peer device. In the example of FIG. 1, the beacon and/or probe intervals are equal in duration.

The timing diagram illustrates periods associated with a first series of discovery operating modes 10 on a first time axis 12 and a second series of discovery operating modes 14 on a second time axis 16. The first series of discovery operating modes is associated with a first mobile device. The second series of discovery operating modes 14 is associated with a second mobile device. The first and second series of discovery operating modes 10, 14 include beacon or probe transmission modes, listen modes, and sleep modes with respective beacon or probe transmission periods $BP_{A1-AN}$, $BP_{B1-BM}$, listen periods $LP_{A1-AN}$, $LP_{B1-BM}$ and sleep periods $SP_{A1-(AN-1)}$, $SP_{B1-(BM-1)}$. N and M are integers greater than 2. Each beacon or probe transmission mode, listen mode, and sleep mode corresponds to one of respective beacon and/or probe intervals$_{1-N}$ and beacon and/or probe intervals$_{1-M}$.

In the example shown, the beacon or probe transmission periods $BP_{A1-AN}$, $BP_{B1-BM}$ may be equal in duration and have a fixed length. The listen periods $LP_{A1-AN}$, $LP_{B1-BM}$ may be equal in duration. The sleep periods $SP_{A1-(AN-1)}$, $SP_{B1-(BM-1)}$ may be equal in duration. To conserve power, the duration of the listen periods $LP_{A1-AN}$, $LP_{B1-BM}$ is less than the duration of the sleep periods $SP_{A1-(AN-1)}$, $SP_{B1-(BM-1)}$. The mobile device has a duty cycle associated with discovery of less than 50%.

Since the mobile devices operate in the listen modes less than in the sleep modes, and the listen and sleep modes are periodic, the mobile devices may not discover each other. For example, when the first mobile device is transmitting a beacon or probe request signal and listening for a response, the second mobile device is operating in a sleep mode. Also, when the second mobile device is transmitting a beacon or probe request signal and listening for a response, the first mobile device is operating in a sleep mode. See, for example, the beacon or probe transmission periods $BP_{A1-A3}$, $BP_{B1-B3}$, listen periods $LP_{A1-A3}$, $LP_{B1-B3}$ and sleep periods $SP_{A1-A3}$, $SP_{B1-B3}$. This inability to discover a peer device may also arise when mobile devices operate in half or full duplex modes (i.e., transmitting beacon or probe request signals while receiving beacon or probe response signals).

Listen period $LP_{AN-1}$ of the first mobile device and beacon or probe period $BP_{BM-1}$ of the second mobile device illustrate an example of when the first mobile device may discover the second mobile device. The beacon or probe transmission period $BP_{BM-1}$ occurs during (or overlaps) the listen period $LP_{AN-1}$.

In the following described embodiments, techniques are disclosed that allow for discovery between peer devices while minimizing discovery ON times and power usage of a mobile devices.

Figure 2A:
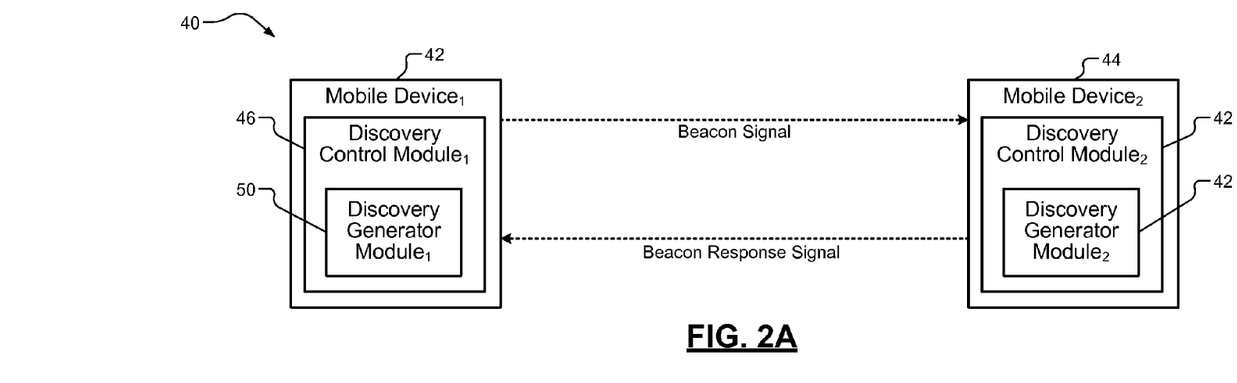
FIG. 2A is a functional block diagram of a peer-to-peer (P2P) network illustrating beacon transmission and including mobile devices configured in accordance with an embodiment of the present disclosure.

In FIG. 2A, a P2P network ("P2P network") 40 is shown. The P2P network 40 includes mobile devices 42, 44 that each operates in an active mode and a sleep mode. When operating in the active mode, the mobile devices 42, 44 transmit beacon signals and listen for beacon response signals. When operating in the sleep mode, the mobile devices 42, 44 are partially powered down or fully powered down.

Figure 3:
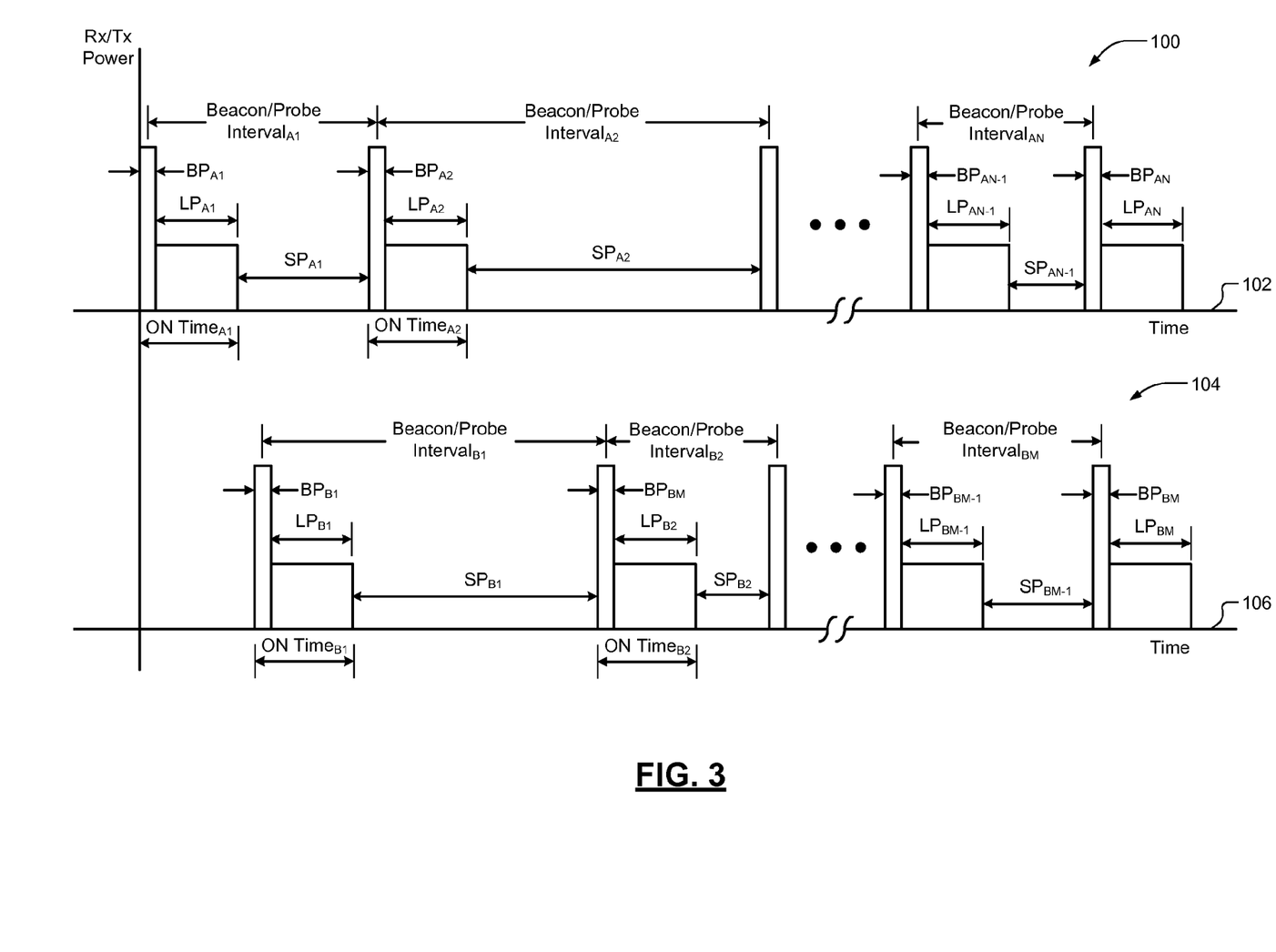
FIG. 3 is a timing diagram illustrating active modes and sleep modes of peer devices with random durations in accordance with an embodiment of the present disclosure.

The mobile devices 42, 44 include respective discovery control modules 46, 48 with discovery generator modules 50, 52. The discovery generator modules 50, 52 determine durations of time in which the mobile devices 42, 44 are to operate in the active mode and the sleep mode. The discovery generator modules 50, 52 can generate pseudo-random and/or fully random values that correspond to the durations of time in which the mobile devices 42, 44 are to operate in the active and sleep modes. An example random-based timing diagram is shown in FIG. 3.

Figure 2B:
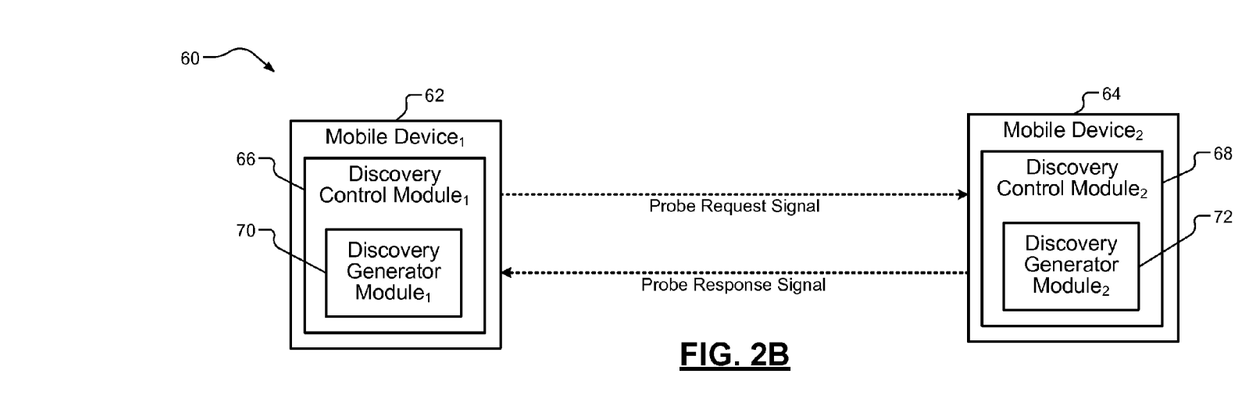
FIG. 2B is another P2P network illustrating probe request signal transmission and including mobile devices configured in accordance with an embodiment of the present disclosure.

In FIG. 2B, another P2P network 60 is shown. The P2P network 60 includes mobile devices 62, 64 that each operate in active and sleep modes. The mobile devices 62, transmit probe request signals and listen for probe response signals during the active modes.

The mobile devices 62, 64 respectively include discovery control modules 66, 68. The discovery control modules 66, 68 respectively include discovery generator modules 70, 72. During the active mode, the discovery generator modules 70, 72 determine durations of listen modes and the sleep modes. The discovery generator modules 70, 72 may generate pseudo-random and/or fully-random values that correspond to the durations of the listen and sleep modes.

Figure 2C:
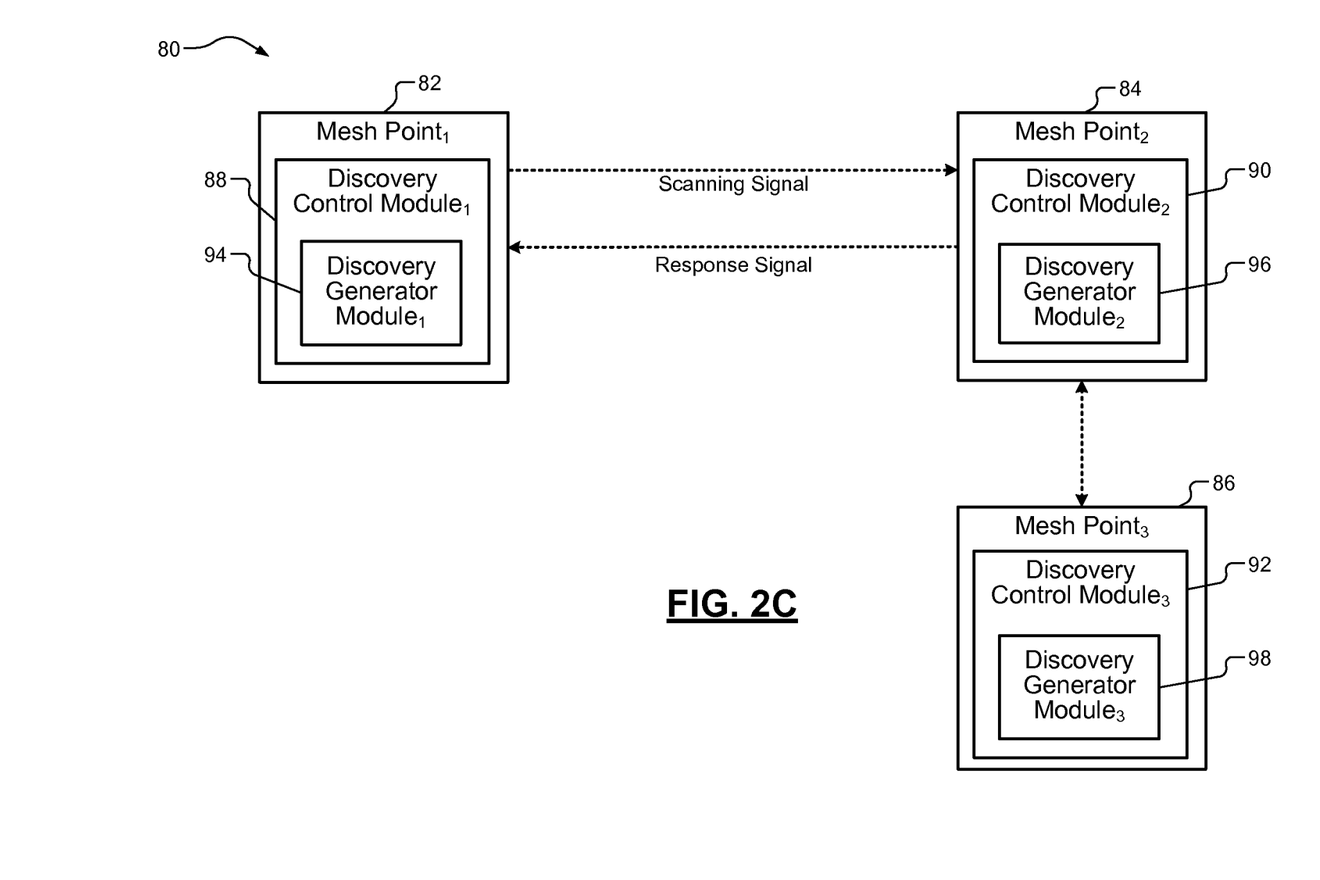
FIG. 2C is yet another P2P network illustrating mesh devices configured in accordance with an embodiment of the present disclosure.

In FIG. 2C, yet another P2P network 80 (mesh network) is shown. The P2P network 80 includes mesh points 82, 84, 86 that operate in active and sleep modes. A mesh point may transmit a beacon signal and listen for beacon response signals during the active modes to discover another mesh point and join a mesh network (i.e., the P2P network 80).

The mesh points 82, 84, 86 include discover control modules 88, 90, 92 with discovery generator modules 94, 96, 98. The discovery generator modules 94, 96, 98 determine durations of listen modes and the sleep modes. The discovery generator modules 94, 96, 98 may generate pseudo-random and/or fully-random values that correspond to the durations of the listen and sleep modes.

Figure 4:
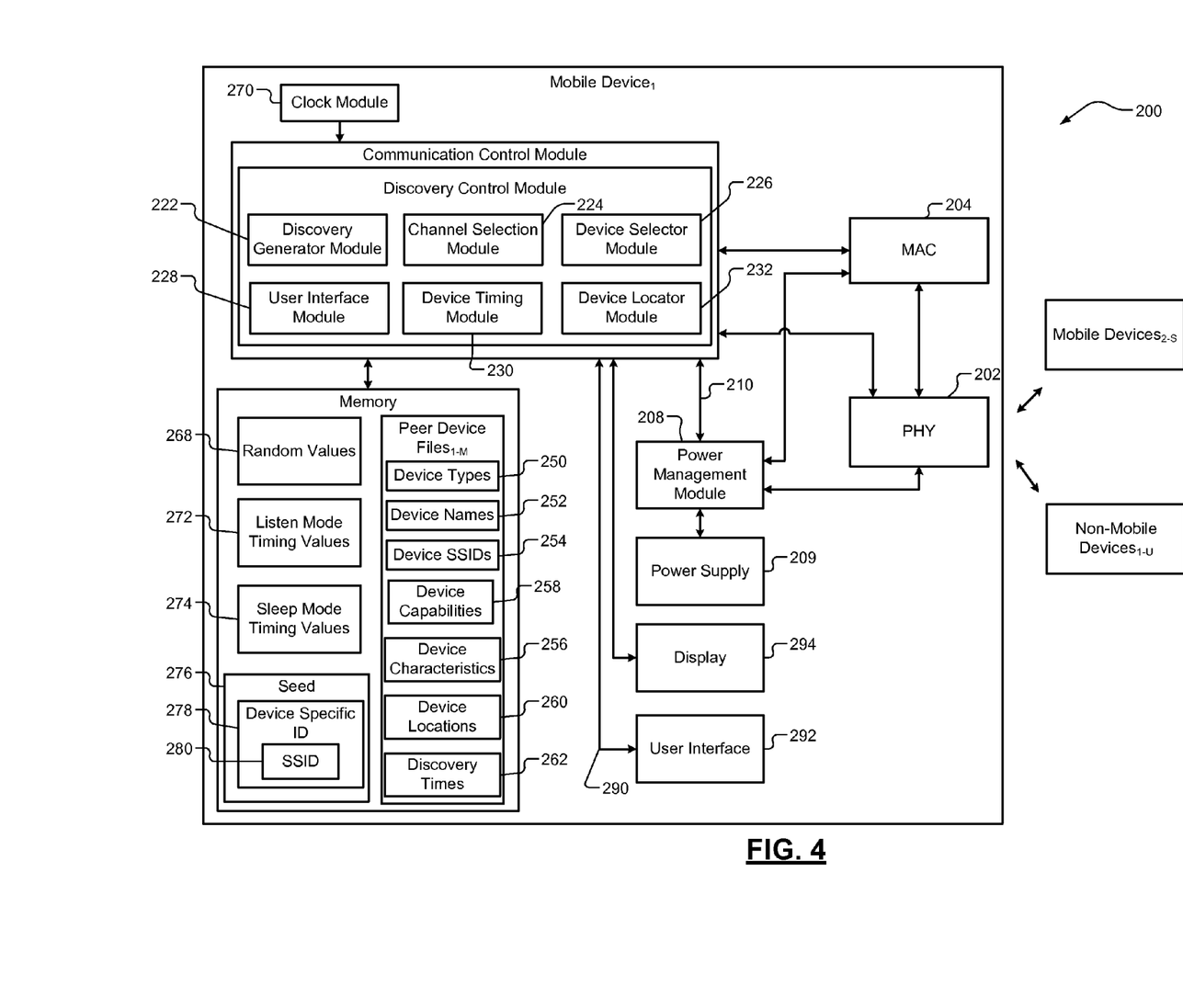
FIG. 4 is a functional block diagram of still another P2P network illustrating a mobile device configured in accordance with an embodiment of the present disclosure.

An example device that may be used as one or more of the mobile devices 42, 44, 62, 64 and the mesh points 82, 84, 86 is provided by the first mobile device$_1$ of FIG. 4.

In FIG. 3, a timing diagram illustrating discovery operating modes of mobile devices operating based on fixed listen mode timing values and randomly generated sleep mode timing values is shown. Listen mode durations and sleep mode durations of the mobile devices are based respectively on the listen mode timing values and the sleep mode timing values. Although the embodiment of FIG. 3 is described with respect to mobile devices, the embodiment may be applied to mesh points.

The timing diagram illustrates periods associated with a first series of discovery operating modes 100 on a first time axis 102 and a second series of discovery operating modes 104 on a second time axis 106. The first series of discovery operating modes 100 is associated with a first mobile device. The second series of discovery operating modes 104 is associated with a second mobile device. The first and second series of discovery operating modes 100, 104 include beacon or probe transmission modes, listen modes, and sleep modes with respective beacon or probe transmission periods $BP_{C1-CN}$, $BP_{D1-DM}$, listen periods $LP_{C1-CN}$, $LP_{D1-DM}$ and sleep periods $SP_{C1-(CN-1)}$, $SP_{D1-(DM-1)}$. Each beacon or probe transmission mode, listen mode, and sleep mode corresponds to one of respective beacon and/or probe intervals$_{1-N\text{ and }1-M}$. N and M are integers greater than 2.

In the embodiment shown, the beacon or probe transmission periods $BP_{C1-N}$, $BP_{D1-M}$ may be equal in duration. Although the listen periods $LP_{C1-CN}$, $LP_{D1-DM}$ are shown having equal duration, the listen periods $LP_{C1-CN}$, $LP_{D1-DM}$ may have different durations. Although the sleep periods $SP_{c1-CN}$, $SP_{D1-DM}$ are shown having different durations, the sleep periods $SP_{C1-CN}$, $SP_{D1-DM}$ may have the same duration. To conserve power, the durations of the listen periods $LP_{C1-CN}$, $LP_{D1-DM}$ is less than the durations of the sleep periods $SP_{C1-CN}$, $SP_{D1-DM}$.

The first and second mobile devices can discover each other when beacons and listen periods overlap. This occurs with the use of random values (random mode durations). Listen period $LP_{BM-1}$ of the second mobile device and beacon or probe period $BP_{AN-1}$ of the first mobile device illustrate an example of when the second mobile device may discover the first mobile device. The beacon or probe transmission period $BP_{AN-1}$ occurs during the listen period $LP_{BM-1}$. Although durations of the active modes are less than the durations of the sleep modes of the first and second mobile device, the first and second mobile devices are able to discover each other by using random discovery mode durations (i.e., random listen and/or sleep mode durations).

In FIG. 4, a P2P network 200 is shown. The P2P network 200 includes mobile devices$_{1-S}$ and non-mobile devices$_{1-U}$, where S is the number of mobile devices and is greater than or equal to 2 and U is an integer greater than or equal to 1. The mobile devices$_{1-S}$ may operate in active or passive scanning modes and discover and communicate directly and wirelessly with each other. The mobile device may discover and communicate directly and wirelessly with the non-mobile devices$_{1-U}$. A host (mobile or non-mobile) device operates in a discovery mode when transmitting beacon and/or probe signals to identify other active mobile and non-mobile devices within a predetermined distance of the host device. Each of the mobile devices$_{1-S}$ and non-mobile devices$_{1-U}$ operates in a half-duplex mode and/or a full-duplex mode.

The mobile devices$_{1-S}$ may perform as one or more of the mobile devices of FIGS. 2A-C. The mobile devices$_{1-S}$ and the non-mobile devices$_{1-U}$ communicate using wireless protocols, such as Wi-Fi network protocols, wireless local area network (WLAN) protocols, IEEE 802.11 wireless network protocols, etc.

The first mobile device$_1$ includes a physical layer (PHY) device 202, a media access controller (MAC) 204, a communication control module 206, and a power management module 208. The mobile devices$_{2-S}$ and non-mobile devices$_{1-U}$ may each include the same or similar elements as the first mobile device$_1$. The PHY device 202 interfaces the first mobile device$_1$ with the mobile devices$_{2-S}$ and non-mobile devices$_{1-U}$. For example, the PHY device 202 transmits or receives beacon signals (i.e., beacons), probe request signals, beacon response signals and/or probe response signals to and from the mobile devices$_{2-S}$ and non-mobile devices$_{1-U}$. The PHY device 202 handles data transfer to and from the mobile devices$_{2-S}$ and non-mobile devices$_{1-U}$. The MAC 204 handles the generation and parsing of frames. The communication control module 206 processes data transmitted to and received from the mobile devices$_{2-S}$ and non-mobile devices$_{1-U}$.

The power management module 208 controls power distribution from a power supply 209 to the PHY device 202, the MAC 204, and the communication control module 206. The power management module 208 may control when the first mobile device$_1$ is operating in sleep modes. The sleep modes are based on a timing signal (included in bi-directional signals 210) from the discovery control module. The timing signal may include start times, durations and/or end times for listen and/or sleep modes. The durations are adjusted to adjust discovery time and power efficiency. The start times, durations and end times may be randomly generated as described below. The random durations can increase discovery time over the use of non-random durations, but allow for reduced active and listen mode durations, which increases power efficiency.

The power management module 208 may depower the first mobile device$_1$ during the sleep modes. During the sleep modes, certain devices or modules may remain powered, for example, for reactivation purposes. For example, the power management module 208 may remain active to determine when to repower other devices and/or modules of the first mobile device$_1$ subsequent to a sleep mode. The first mobile device$_s$ generates beacons or probe response signals when reactivated and operating in the discovery mode.

The communication control module 206 includes a discovery control module 220. The discovery control module 220 includes a discovery generator module 222, a channel selection module 224, a device selector module 226, a user interface module 228, a device timing module 230, and a device locator module 232. The discovery control module 220 controls discovery operations including the generation, reception and processing of discovery signals. The discovery control module 220 also controls the accessing and storing of discovery information, such as the characteristics and capabilities of a host device (i.e., mobile device$_1$) and of discovered or peer devices (mobile devices$_{2-S}$ and non-mobile devices$_{1-U}$). This information is stored in memory 240 in respective peer files$_{1-P}$, where P is an integer that is greater than or equal to 2. P is greater than or equal to S, U and/or S+U.

The peer files$_{1-P}$ include device types 250, device names 252, device SSIDs 254, device characteristics 256, device capabilities 258, device locations 260, device times 262, etc. The device types 250 indicate, for example, whether a device is a router, a computer, a printer, a hub, a server, etc. The device names 252 are user recognizable names or names that a user can identify. For example, a SSID is not a user recognizable name, as a SSID is a device specific number. A device name, as used herein, refers to terms or labels, such as "printer", "fax", "contact name", etc. that a user of the mobile device$_1$ recognizes and can select upon being discovered.

The discovery control module 220 generates timing signals via the discovery generator module 222 while operating in the discovery mode. The discovery generator module 222 generates the timing signals based on random values 268. The random values 268 may be generated based on clock signals from a clock module 270 and stored in the memory 240. The discovery generator module 222 generates listen mode timing values 272 and sleep mode timing values 274, such as start times, durations and/or end times of listen and sleep modes based on the random values 268. Use of the random values 268 results in beacon intervals and/or probe intervals that are random in duration.

The discovery generator module 222 generates the random values using an algorithm, which may be polynomial based. The algorithm may generate the random values based on a seed 276. The seed 276 is stored in the memory 240, as shown or in the discovery control module 220, on an integrated circuit (IC) of the discovery control module 220, etc. As an example, the seed 276 may include a device specific ID 278 of the first mobile device$_1$. The device specific ID 278 may include a BSSID 280 (e.g., an IEEE 802.11 BSSID) of the first mobile device$_1$. The device specific ID 278 may be a value of component of the first mobile device$_1$ or and a value generated by a component of the first mobile device$_1$.

The channel selection module 224 selects a channel (i.e., frequency or range of frequencies) on which to transmit a beacon or probe request signal. The channel selection module 224 selects a channel based on a predetermined or random set of channels and/or based on a seed. The channels may be randomly selected based on a random selection algorithm, which may be polynomial based. The seed may be seed 276 or a different seed.

The channel selection module 224 enables operation of the first mobile device$_1$ in static and non-static modes. The static mode refers to when the PHY device 202 transmits discover request signals on a single fixed channel. The non-static mode refers to when the PHY device 202 transmits discover request signals on different channels. Transmission on different channels allows for discovery of additional mobile and non-mobile devices. The channels may be randomly selected while operating in the discovery mode, such as during a sleep mode or prior to transmission of beacons or probe request signals.

The channel selection module 224 allows for the first mobile device$_1$, via the PHY device 202 to transmit beacons or probe request signals on a first channel while receiving beacons, probe request signals, beacon response and/or probe response signals on channels other than the first channel. In one embodiment, the first mobile device$_1$ may maintain transmission of beacons or probe request signals on a single channel (operate in a static mode) to allow other mobile devices to discover the first mobile device$_1$. In another embodiment, the first mobile device$_1$ transmits beacons or probe request signals on different channels (operate in a non-static mode) to discover other mobile devices on multiple channels.

The device selector module 226 selects one or more of the discovered mobile devices$_{2-S}$ and/or non-mobile devices$_{1-U}$ based on a predetermined criterion and/or based on a user request signal (included in bi-directional signals 290) received from a user interface 292. The predetermined criterion may include device requirements, such as distance, location, type, data rate, frequency, channel, etc. For example, the device selector module 226 may select the one of the mobile devices$_{2-S}$ that: is within a certain distance from the first mobile device$_1$; communicates at a predetermined speed; and communicates on a particular frequency. As another example, the first mobile device$_1$ may be a cellular phone that is searching for printers and selects Y printers out of X discovered printers. One of the Y printers may be selected as a default, based on a predetermined criterion and/or based on a user request signal. The user may select one of the Y printers, which is displayed to the user via a display 294. The user interface 292 may be, for example, a keypad, a touch screen, etc.

The device timing module 230 records timestamps of when mobile devices$_{2-S}$ and non-mobile devices$_{1-U}$ are discovered. The timestamps are stored as the discovery times in the peer files$_{1-P}$. The timestamps may include times of day and dates when the mobile devices$_{2-S}$ and non-mobile devices$_{1-U}$ are discovered. This information may be used for mobile and non-mobile device selection and for setting mobile and non-mobile device selecting criterion.

The device locator module 232 records locations of discovered mobile and non-mobile devices. The locations may include longitudinal and latitude coordinates. Location information may be obtained from a global positioning system (GPS) and/or based on GPS signals received by the first mobile device$_1$. The location and/or GPS signals are generated by the first mobile device$_1$ or are received from a discovered device, a satellite, a base station, etc. The location of a discovered device may be determined based on response time associated with the discovered device. The locations are stored as the device locations in the peer files$_{1-P}$.

The discovery control module 220 discard discovery times, device locations, and/or other information in the peer files$_{1-P}$ over time. The information may be discarded based on time stored, accessed frequency, a hierarchical or prioritization rating, etc. A least recently used algorithm is used for discard selection purposes.

Although the devices and modules of FIG. 4 are shown as distinct items, one or more may be implemented as a single item and/or implemented on a single IC. For example, the PHY device 202, the MAC 204, the communication control module 206, the power management module 208, the memory 240, and the clock module 270 may be implemented as a single item and/or on a single IC.

Figure 5:
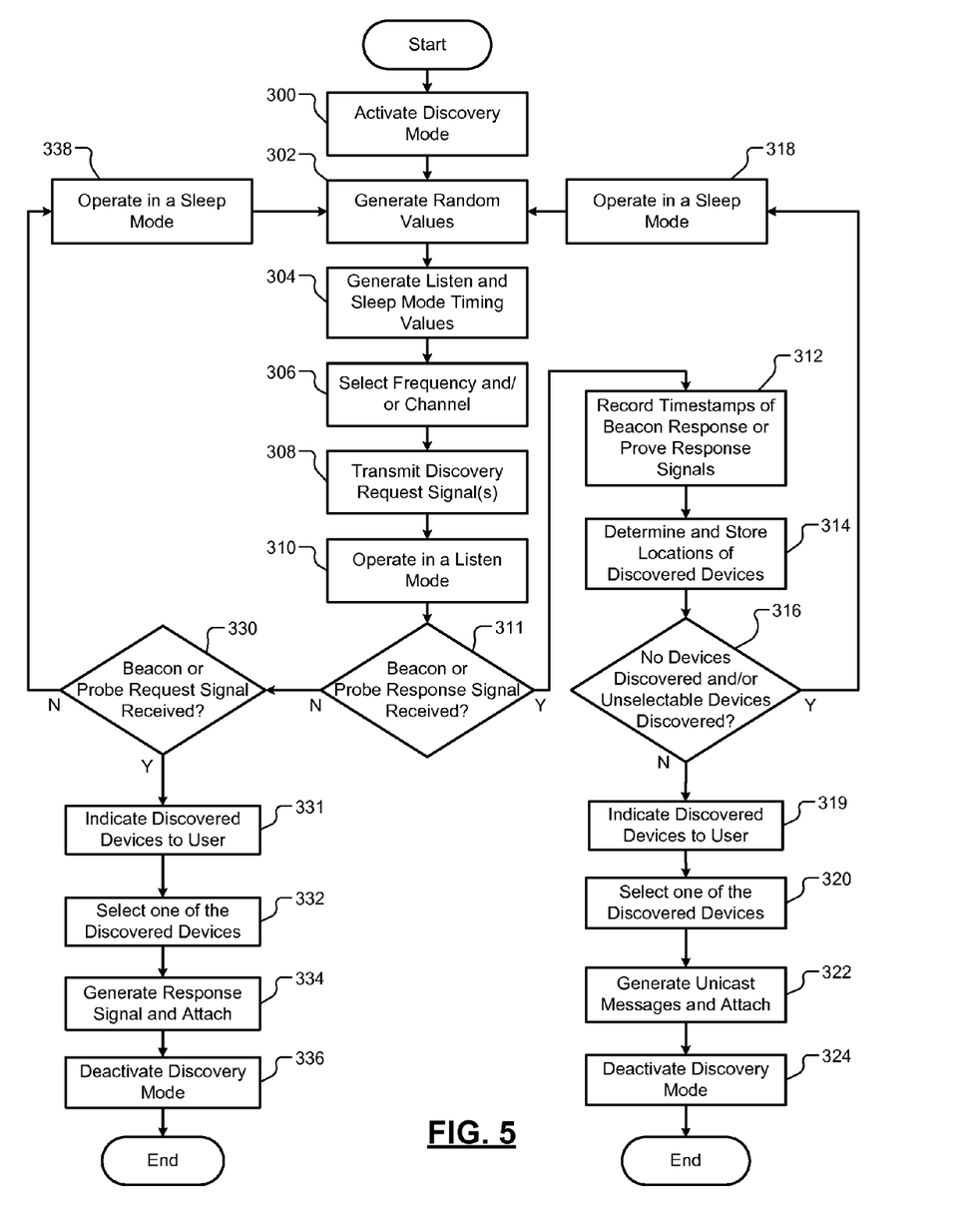
FIG. 5 illustrates a method of operating a mobile device in accordance with an embodiment of the present disclosure.

In FIG. 5, a method of operating a mobile device including a method of determining a length of time that the mobile device is to operate in different modes of operation. The method may be implemented by any of the mobile devices shown in FIGS. 2A-C and 4. Although the following tasks are described primarily with respect to the embodiment of FIGS. 3 and 4, the tasks may be applied to other embodiments of the present disclosure.

At 300, the discovery control module 220 activates a discovery mode to discover other mobile and non-mobile devices. At 302, the discovery generator module 222 of the first mobile device$_1$ generates one or more random values. The random values may be pseudo-random values or fully-random values. The random values may be generated based on a seed, such as the seed 276. The seed may be based on an SSID, BSSID and/or the device specific ID of the first mobile device$_1$. This prevents devices that perform discovery using the same discovery functions, algorithms and/or techniques from operating in listen and sleep modes during the same time periods, as the seeds and corresponding random values of each device are different.

At 304 and during the active mode, the discovery generator module 222 generates listen and/or sleep mode timing values. One or more of the listen and/or sleep mode timing values may be generated based on the random values. In one embodiment, the listen mode timing values are fixed values that are predetermined and stored in the memory and the sleep mode timing values are random values. In another embodiment, the sleep mode timing values are fixed values that are predetermined and stored in the memory and the listen mode timing values are random values. In yet another embodiment, both the listen mode timing values and the sleep mode timing values are random values.

The discovery generator module 222 may randomly select which beacon intervals and/or probe intervals of the first mobile device$_1$ that include fixed or random duration listen modes and fixed or random duration sleep modes. The discovery generator module 222 may alternate between fixed and random duration listen modes and/or may alternate between fixed and random duration sleep modes for a series of beacon intervals or probe intervals.

At 306, the channel selection module 224 selects one or more frequencies and/or channels on which to transmit discovery request signal(s). The discovery request signal(s) may be one of beacon signal(s) and probe request signal(s). The channel selection module 224 may randomly select the frequencies and/or channels based on pseudo-random or fully-random values, which may be based on a seed, such as the seed 276.

At 308, the PHY device 202 transmits the discovery request signal(s) on one or more of the selected frequencies and/or channels and based on at least one of the listen mode timing values and the sleep mode timing values. Discovery request signals may be transmitted at beacon intervals or probe request intervals with random durations. The beacon intervals or probe request intervals are based on the durations of the listen modes and the sleep modes.

At 310, the first mobile device$_1$ operates in a listen mode. The listen mode may be enabled by the discovery control module 220 or the power management module 208. The listen mode may have a fixed or random start time, duration and/or end time and is based on the listen mode timing values of 304. During the listen mode, the first mobile device$_1$ listens for and receives one of beacon response signals and probe response signals. During the listen mode, the first mobile device$_1$ may also listen for beacons and/or probe request signals from other mobile and/or non-mobile devices.

At 311, the discovery control module 220 determines whether beacon or probe response signals were received. The discovery control module 220 proceeds to 312 when beacon or probe response signals were received, otherwise to 330.

At 312, the device timing module 230 records timestamps associated with discovered devices. The timestamps are generated when the beacon response signals or probe response signals are received. The timestamps are stored in the memory 240. At 314, the device locator module 232 determines locations of the discovered devices. The locations are stored in the memory 240.

At 316, the discovery control module 220 determines whether no devices are discovered and/or whether unselectable devices are discovered. At 318, the discovery control module 220 operates in a sleep mode when no devices are discovered and/or unselectable devices are discovered. The sleep mode may have a fixed or random start time, duration and/or end time and is based on the sleep mode timing values. The sleep mode may be initiated by the discovery control module 220 or by the power management module 208.

During the sleep mode the power management module 208 may partially or fully deactivate any of the modules and/or devices of the first mobile device$_1$. A portion of the discovery control module 220 and/or the power management module 208 may remain in an active state during the sleep mode. The discovery control module 220 and/or the power management module 208 may wake up modules and/or devices of the first mobile device$_1$ subsequent to the sleep mode.

At 319, the user interface module 228 may indicate to a user the discovered devices for selection by the user. At 320, the device selector module 226 selects one of the discovered devices based on a user request signal and/or based on a selection criterion, as described above. At 322, the PHY device 202 may transmit unicast signals to the selected devices to obtain additional information from selected devices. The additional information may include characteristics and capabilities of the selected devices. The first mobile device$_1$ may attach to the selected device(s). At 324, the discovery control module 220 may deactivate the discovery mode.

At 330, the discovery control module 220 determines whether beacon or probe request signal(s) are received. The discovery control module proceeds to 331 when beacon or probe request signal(s) are received, otherwise to 338. At 331, the user interface module 228 may indicate to a user the discovered devices that transmitted the beacon or probe request signal(s) for selection by the user.

At 332, the device selector module 226 selects one of the discovered devices that transmitted the beacon or probe request signal(s) based on a user request signal and/or based on a selection criterion, as described above. At 334, the discovery control module 220 instructs the PHY device 202 to generate a beacon and/or probe response signal, which is transmitted to the selected device(s). The first mobile device$_1$ may attach to the selected device(s). The first mobile device$_1$ may transmit request signals to obtain additional information from the selected device(s), such as characteristics and capabilities of the selected device(s). At 336, the discovery control module may deactivate the discovery mode.

At 338, the discovery control module 220 may operate in a sleep mode at 318, which may be self initiated or initiated by the power management module 208.

The above-described tasks of the method of FIG. 5 are meant to be illustrative examples; the tasks may be performed sequentially, synchronously, simultaneously, continuously, during overlapping time periods or in a different order depending upon the application. For example, when operating in a full-duplex mode, a mobile device may transmit discovery request signals while listening for discovery request signals and/or discovery response signals. Thus, 308 and 310 may be performed during the same time period.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. An integrated circuit configured to operate in a mobile device, the integrated circuit comprising:
a discovery generator module configured to generate a random value for each of a plurality of beacon intervals;
a discovery control module configured to, for a first beacon interval of the plurality of beacon intervals in which the mobile device is to operate in a sleep mode, determine a duration of the first beacon interval based on the random value corresponding to the first beacon interval; and
a physical layer device configured to wirelessly transmit a discovery request signal (i) in a peer-to-peer network having a plurality of peer devices, and (ii) while the mobile device is operating in an active mode, wherein the discovery control module is configured to determine which of the plurality of peer devices are discoverable based on responses to the discovery request signal received from discovered ones of the plurality of peer devices, wherein none of the plurality of peer devices operates as an access point,
wherein the mobile device is partially powered down or fully powered down during the duration of the first beacon interval, and
wherein the discovery control module is configured to operate the mobile device in the sleep mode in response to whether the mobile device receives a response to the discovery request signal.

2. The integrated circuit of claim 1, wherein the discovery request signal comprises a beacon signal or a probe request signal.

3. The integrated circuit of claim 1, further comprising a memory to store a seed,
wherein the discovery generator module is configured to generate the random value for each of the plurality of beacon intervals based on the seed.

4. The integrated circuit of claim 3, wherein the seed is at least one of a device specific identifier and a service set identifier of the mobile device.

5. The integrated circuit of claim 4, wherein the device specific identifier is one of:
a component of the mobile device; and
a value generated by a component of the mobile device.

6. The integrated circuit of claim 1, wherein:
the discovery control module is configured to operate in a listen mode and in the sleep mode, wherein the discovery control module is configured to operate in the listen mode while the mobile device is operating in the active mode; and
for each respective one of the plurality of beacon intervals,
a duration of time in which the discovery module operates in the listen mode is fixed, and
a duration of time in which the discovery control module operates in the sleep mode is based on the random value generated for the respective one of the plurality of beacon intervals.

7. An integrated circuit configured to operate in a mobile device, the integrated circuit comprising:
a discovery generator module configured to generate a random value for each of a plurality of beacon intervals;
a discovery control module configured to determine (i) a first duration of one of the plurality of beacon intervals in which the mobile device is to operate in an active model and (ii) a second duration of the one of the plurality of beacon intervals in which the mobile device is to operate in a sleep mode, wherein the first duration or the second duration is based on the random value generated for the one of the plurality of beacon intervals; and
a physical layer device configured to wirelessly transmit a discovery request signal during the first duration the mobile device is operating in the active mode,
wherein the mobile device is partially powered down or fully powered down during the second duration the mobile device is operating in the sleep mode,
wherein the discovery control module is configured to operate (i) in a listen mode and in the sleep mode, and (ii) in the listen mode during at least a portion of the first duration the mobile device is operating in the active mode, and
wherein for each respective one of the plurality of beacon intervals,
a duration of time in which the discovery control module operates in the sleep mode is fixed, and
a duration of time in which the discovery control module operates in the listen mode is based on the random value generated for the respective one of the plurality of beacon intervals.

8. A method of operating an integrated circuit configured to operate in a mobile device, the method comprising:
generating a random value for each of a plurality of beacon intervals;
determining a first duration of one of the plurality of beacon intervals in which the mobile device is to operate in an active mode, wherein the first duration is based on the random value generated for the one of the plurality of beacon intervals;
determining a second duration of the one of the plurality of beacon intervals in which the mobile device is to operate in a sleep mode, wherein the second duration is based on the random value generated for the one of the plurality of beacon intervals;

wirelessly transmitting a discovery request signal from the mobile device during the first duration of the one of the plurality of beacon intervals the mobile device is operating in the active mode, wherein the mobile device is partially powered down or fully powered down during the second duration of the one of the plurality of beacon intervals the mobile device is operating in the sleep mode;

operating the mobile device in a listen mode and in the sleep mode in response to whether the mobile device receives a response to the discovery request signal; and operating the mobile device in the listen mode during at least a portion of the first duration of the one of the plurality of beacon intervals the mobile device is operating in the active mode, wherein for each respective one of the plurality of beacon intervals, a duration of the listen mode is fixed, and a duration of the sleep mode is based on the random value generated for the respective one of the plurality of beacon intervals.

9. The method of claim 8, wherein the discovery request signal comprises a beacon signal or a probe request signal.

10. The method of claim 8, further comprising:
storing a seed in memory; and
generating the random value for each of the plurality of beacon intervals based on the seed.

11. The method of claim 10, wherein the seed is at least one of a device specific identifier and a service set identifier of the mobile device.

12. The method of claim 11, wherein the device specific ID is one of:
a component of the mobile device; and
a value generated by a component of the mobile device.

13. A method of operating an integrated circuit configured to operate in a mobile device, the method comprising:
generating a random value for each of a plurality of beacon intervals;
determining a first duration of one of the plurality of beacon intervals in which the mobile device is to operate in an active mode, wherein the first duration of the plurality of beacon intervals is based on the random value generated for the one of the plurality of beacon intervals;
determining a second duration of the one of the plurality of beacon intervals in which the mobile device is to operate in a sleep mode, wherein the second duration of the one of the plurality of beacon intervals is based on the random value generated for the one of the plurality of beacon intervals;
wirelessly transmitting a discovery request signal from the mobile device during the first duration of the one of the plurality of beacon intervals the mobile device is operating in the active mode, and
wherein the mobile device is partially powered down or fully powered down during the second duration of the one of the plurality of beacon intervals the mobile device is operating in the sleep mode;
operating the mobile device in a listen mode and in the sleep mode; and
operating the mobile device in the listen mode during at least a portion of the first duration of the one of the plurality of beacon intervals the mobile device is operating in the active mode,
wherein for each respective one of the plurality of beacon intervals,
duration of the sleep mode is fixed, and
duration of the listen mode is based on the random value generated for the respective one of the plurality of beacon intervals.

14. The integrated circuit of claim 1, wherein:
the discovery generator module is configured to generate a second random value for each of the plurality of beacon intervals;
the discovery control module is configured to operate in a listen mode and in the sleep mode;
the discovery control module is configured to operate in the listen mode during at least a portion of a first duration of the one of the plurality of beacon intervals the mobile device is operating in the active mode; and
for each respective one of the plurality of beacon intervals,
a duration of time in which the discovery control module operates in the sleep mode is based on the random value generated for the respective one of the plurality of beacon intervals, and
a duration of time in which the discovery control module operates in the listen mode is based on the second random value generated for the respective one of the plurality of beacon intervals.

15. The integrated circuit of claim 14, wherein for each respective one of the plurality of beacon intervals, the duration of time that the discovery control module operates in the listen mode is less than the duration of time the discovery control module operates in the sleep mode.

16. The integrated circuit of claim 1, wherein the discovery generator module is configured to
randomly select ones of the plurality of beacon intervals, wherein the mobile device, during each of the selected ones of the plurality of beacon intervals, operates in the sleep mode for a fixed duration of time; and
randomly select other ones of the plurality of beacon intervals, wherein the mobile device, during each of the selected other ones of the plurality of beacon intervals, operates in the sleep for a random duration of time.

17. The integrated circuit of claim 16, wherein the discovery generator module is configured to, for consecutive ones of the plurality of beacon intervals, alternate between (i) operating in the sleep mode with the fixed duration of time, and (ii) operating in the sleep mode with the random duration of time.

18. The integrated circuit of claim 1, wherein the discovery generator module is configured to:
randomly select ones of the plurality of beacon intervals, wherein the mobile device, during each of the selected ones of the plurality of beacon intervals, operates in a listen mode for a fixed duration of time; and
randomly select other ones of the plurality of beacon intervals, wherein the mobile device, during each of the selected ones of the plurality of beacon intervals, operates in the listen mode for a random duration of time.

19. The integrated circuit of claim 18, wherein the discovery generator module is configured to, for consecutive ones of the plurality of beacon intervals, alternate between (i) operating in the listen mode with the fixed duration of time, and (ii) operating in the listen mode with the random duration of time.

20. The integrated circuit of claim 1, wherein the discovery generator module is configured to, for each of selected ones of the plurality of beacon intervals, randomly select start times and end times of the sleep mode.

21. The integrated circuit of claim 1, further comprising a device selector module configured to (i) select one of the discovered ones of the plurality of peer devices based on the responses to the discovery request signal, and (ii) not select other ones of the discovered ones of the plurality of peer devices.

22. The integrated circuit of claim 1, further comprising a device selector module configured to select one of the discovered one or more peer devices based on a predetermined criterion.

23. The integrated circuit of claim 22, wherein the predetermined criterion comprises the selected one of the discovered one or more peer devices:
being within a predetermined distance of the mobile device;
communicating at a predetermined communication speed; and
communicating at a predetermined frequency.

24. The integrated circuit of claim 1, wherein durations of the plurality of beacon intervals are (ii) different, and (ii) based on the random values.

25. The integrated circuit of claim 7, wherein:
the first duration is less than the second duration; and
durations of the plurality of beacon intervals are (ii) different, and (ii) based on the random values.

26. The method of claim 8, wherein
the first duration is less than the second duration; and
durations of the plurality of beacon intervals are (ii) different, and (ii) based on the random values.

* * * * *